B. N. HAWES.
APPARATUS FOR MERGING MILK AND BUTTER.
APPLICATION FILED MAY 25, 1909.
934,169.
Patented Sept. 14, 1909.
2 SHEETS—SHEET 1.
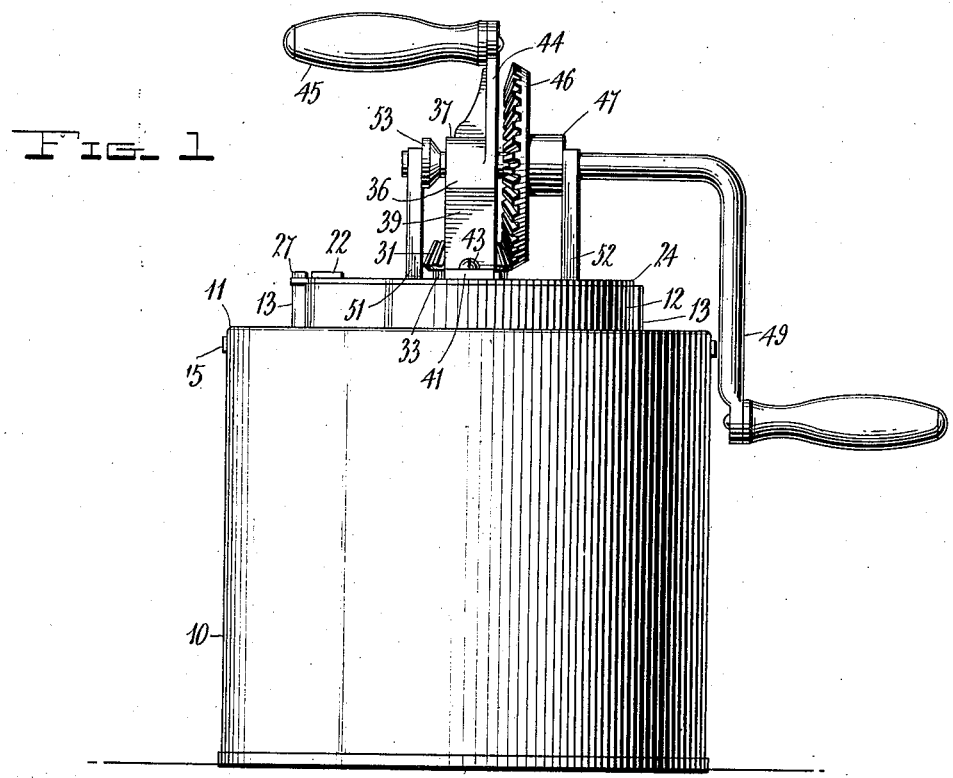
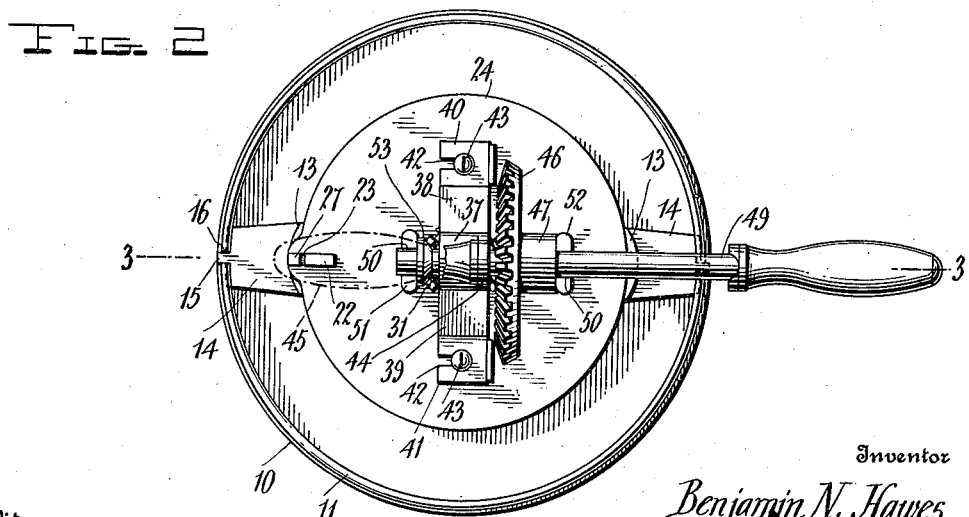
Inventor
Benjamin N. Hawes,
Witnesses
By
Attorneys B. N. HAWES.
APPARATUS FOR MERGING MILK AND BUTTER.
APPLICATION FILED MAY 25, 1909.
934,169.
Patented Sept. 14, 1909.
2 SHEETS—SHEET 2.
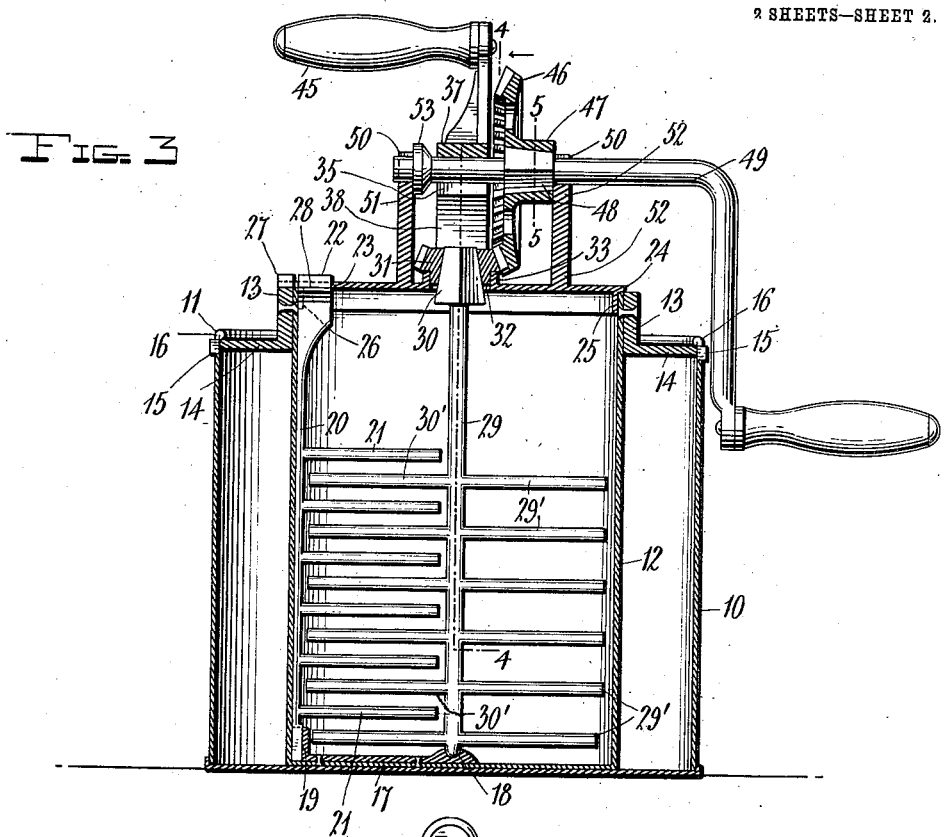
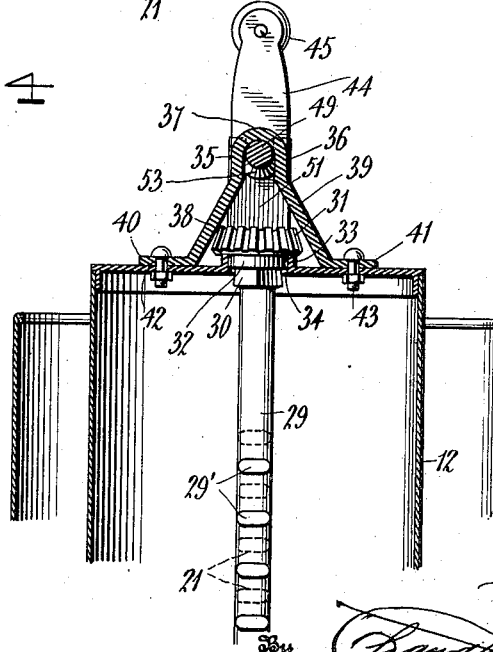
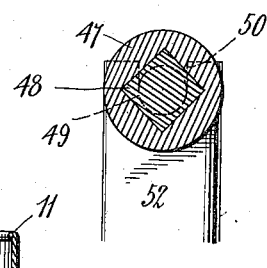
Witnesses
Inventor
Benjamin N. Hawes
Attorneys

UNITED STATES PATENT OFFICE.

BENJAMIN N. HAWES, OF WASHINGTON, DISTRICT OF COLUMBIA.

APPARATUS FOR MERGING MILK AND BUTTER.

934,169.

Specification of Letters Patent. Patented Sept. 14, 1909.

Application filed May 25, 1909. Serial No. 498,162.

*To all whom it may concern:*

Be it known that I, BENJAMIN N. HAWES, a citizen of the United States, residing at Washington, in the District of Columbia, have invented certain new and useful Improvements in Apparatus for Merging Milk and Butter; and I do hereby declare the following to be a full, clear, and exact description of the invention, such as will enable others skilled in the art to which it appertains to make and use the same.

This invention relates to butter working machines and is designed particularly for use in the practice of merging milk with butter and producing an emulsion. It has been found by me in the practice of the said process, wherein cold milk and soft butter are placed together in a vessel and agitated and at the same time subjected to the influence of a surrounding body of hot water, that the capacity of the vessel containing the water must be so accurately proportioned to the vessel in which the milk and water are commingled, that with a predetermined temperature of the surrounding body of water, heat units will be delivered to the butter and milk in sufficient quantity and at such a rate as to cause melting of the butter only as rapidly as it will take up the milk. In other words, extreme care must be exercised in proportioning the different parts of the apparatus to insure the changing of the temperatures of the butter and milk both at the proper rate and at the proper degree.

The object of the invention is not only to provide an apparatus embodying the broad principles necessary for efficient practice of the process, but a specified mechanical structure which will be cheap of manufacture and durable so that the article may be placed upon the market at a price and sufficiently proof against disarrangement of its parts as to insure its domestic use.

Referring now to the drawings, forming a portion of this specification and in which like numerals of reference indicate similar parts in the several views, Figure 1 is a side elevation of a mechanism embodying the present invention. Fig. 2 is a top plan view. Fig. 3 is a section on the line 3—3 of Fig. 2, with parts in elevation. Fig. 4 is a section on the line 4—4 of Fig. 3. Fig. 5 is a section on the line 5—5 of Fig. 3.

Referring now to the drawings, the present apparatus comprises an outer vessel 10 of cylindrical form and having at its upper edge an inwardly curled bead 11, for purposes to be presently explained. In connection with the vessel 10 there is employed a second cylindrical vessel 12 which in practice is disposed centrally of the vessel 10 and is held in such position by means of a pair of angular brackets 13 each of which comprises a finger 14 which radiates from the vessel 12. These brackets are riveted or otherwise secured to the vessel 12 at diametrically opposite points of its upper edge portion and the extremities of the fingers 14 thereof contact with corresponding portions of the inner face of the vessel 10 directly below the bead 11 so that the head prevents upward disengagement of the fingers and corresponding displacement of the inner vessel 12, it being understood that the vessel 10 is of a material that will permit it to be sprung so that this engagement of the fingers may be accomplished. To prevent rotation or lateral displacement of the vessel 12 within the vessel 10, each of the fingers 14 is provided with a lug 15 which is engaged in a corresponding slot 16 in the upper edge portion of the vessel 10.

In the practice of the process above referred to, the butter and milk are agitated and commingled within the vessel 12, to accomplish which result the following described mechanism is employed.

Upon the bottom of the vessel 12 is secured a radial plate 17 having a bearing socket 18 located centrally of the vessel 12 and having at its extremity against the wall of the vessel an angular socket 19. In the angular socket 19 is received the correspondingly shaped foot of an upright 20 having fingers 21 that extend radially of the vessel 12 in parallel relation as illustrated. The foot of the upright 20 is removably engaged in the socket 19 and to hold the upright in erect position its upper angular end 22 is engaged in a radial slot 23 formed in the cover 24 that is provided for the vessel 12, said cover including a depending flange 25 which engages snugly within the upper portion of the vessel 12 and is cut away as shown at 26 to correspond to the slot 23 in the top portion of the cover. The slotted portion of the top member of the cover 24 projects slightly beyond the outer wall of the member 12 so as to receive in its slot an upwardly projecting lug 27 formed on one of the brackets 13. The lug 27 thus holds the cover from rotating on the vessel 12 and the cover in turn holds the upper end of the upright 20 against displacement. The upper end portion of the upright 20 is flanged as shown at 28 directly beneath the cover 24 to prevent upward displacement of the upright from the socket 19.

In connection with the fingers 21, which are baffles, there is employed a stirrer or dasher including a shaft 29, having fingers 29′ and 30′ that radiate respectively from diametrically opposite sides of the shaft 29, each finger 29′ being in the same plane with a corresponding finger 30′ and both the fingers 29′ and 30′ being spaced apart the same distance as are the fingers 21 but alternating in elevation therewith so that as the dasher is rotated, the fingers 29′ and 30′ will move between and out of contact with the fingers 21. The lower end of the shaft 29 has a bearing in the socket 18 while its upper end is provided with a frusto-pyramidal enlargement 30 that snugly engages a corresponding central opening in a bevel pinion 31 having a depending stub shaft 32 that rotatably engages within a flange 33 that circumscribes a central opening 34 in the cover 24. By reason of the frusto-pyramidal shape of the enlargement 30, it permits of instant removal or application of the pinion 31 with respect thereto and of the cover 24 with respect to the vessel 12 and to prevent accidental removal of the pinion from the shaft 29 and the flange of the cover, there is provided a keeper which supports also a handle for steadying the apparatus during the operation. The keeper comprises a pair of arms 35 and 36 which adjacent their mutual upper end connection 37 are parallel and below which parallel portions they diverge downwardly as shown at 38 and 39 and are then extended in opposite directions in a common plane to form feet 40 and 41 which are slotted as shown at 42 to receive bolts 43 through the medium of which they are securely fastened against the upper face of the cover 24 and with the portions 38 and 39 straddling the pinion 31 in such close relation thereto as to prevent upward movement of the pinion to a degree sufficient to permit of its removal from the flange 33. From the connecting portion 37 of the members 35 and 36 there is an upward extension 44 with which is engaged a horizontally lying handle 45.

To rotate the pinion 31 and therewith the stirrer or dasher, there is employed a bevel gear wheel 46 including a hub 47 having a central cross sectionally angular passage which is shaped to snugly receive the frusto-pyramidal enlargement 48 formed upon a crank shaft 49 having a bearing in the open topped journals 50 formed in the upper ends of posts 51 and 52 formed upon the cover 24. The post 52 is so positioned that when the gear 46 is in mesh with the pinion 31 the end of the hub 47 at the minor end of its axial passage will rest against the post 52 so that movement of the gear from engagement with the pinion will be prevented, longitudinal movement of the crank shaft 29 in the corresponding direction being of course prevented by the corresponding tapers of the hub passage and the enlargement 48. Longitudinal movement of the crank shaft in the opposite direction is prevented by the circumscribing flange 53 on the shaft which bears against the inner face of the post 51. Upward displacement of the crank shaft 49 from its bearings is prevented by the portion 37 of the combined handle support and pinion keeper hereinafter referred to, said portion 37 passing over and in close relation to the crank shaft.

In the use of the present apparatus, equal parts by weight of butter and milk are placed within the receptacle or vessel 12, the butter in a more or less soft state to facilitate its passage between the fingers 21 of the baffle and the milk, cold or at a temperature of about 50 degrees. Water at a temperature of from 100 to 110 degrees Fahrenheit is then placed in the vessel 10 in quantity sufficient to stand at a height somewhat above the contents of the vessel 12, the relative proportions of the vessels being substantially those illustrated. The crank shaft 49 is then rotated through the medium of its handle, first slowly to make sure that the contents of the vessel 12 are in such a state as will insure their passage between the fingers of the baffle and the dasher, and then at a speed of about 120 revolutions per minute. At the end of about three minutes it will be found that the milk has entirely merged into the butter in the form of an emulsion. If it is desired to color the product, the proper matter in suitable quantity may be then added and the apparatus operated sufficiently long to mix the coloring matter thoroughly through the product.

Having thus described the invention, what is claimed as new, is:—

1. An apparatus for emulsifying milk and butter comprising an outer resilient vessel having an inwardly directed bead and an inner vessel having radiating fingers proportioned and arranged to engage the sides of the outer vessel beneath the bead thereof, and means for holding the inner vessel against rotation in the outer vessel.

2. An apparatus for emulsifying milk and butter comprising an outer resilient vessel having side openings, and an inner vessel having radiating fingers proportioned and arranged to engage the sides of the outer vessel, said fingers having lugs engaging the corresponding side openings.

3. An apparatus for emulsifying milk and butter comprising an outer vessel having side openings, an inner vessel having radiating fingers proportioned and arranged to engage the sides of the outer vessel, said fingers having lugs engaging the corresponding side openings of the outer vessel, and a cover for the inner vessel in locking engagement with one of said fingers.

4. An apparatus for emulsifying milk and butter comprising an outer vessel, an inner vessel having positioning fingers disposed to engage the outer vessel and hold the inner vessel in fixed position therein, a lug upon one of said fingers, a cover for the inner vessel engaged with the lug and a baffle removably engaged at one end within the inner vessel and at its other end with the cover.

5. An apparatus for emulsifying milk and butter comprising an outer vessel, an inner vessel having positioning fingers disposed to engage the outer vessel and hold the inner vessel in fixed position therein, a lug upon one of said fingers, a cover for the inner vessel having a slot in which the lug is removably engaged, and a baffle removably engaged at one end within the inner vessel and at its opposite end in the slot of the cover.

6. An apparatus for emulsifying milk and butter comprising an emulsion vessel, a dasher within the vessel, a cover for the vessel, an operating bevel gear for the dasher lying exteriorly of the vessel, a second bevel gear meshing with the first named bevel gear and having a cross-sectionally angular axial passage tapering in a direction away from the first named gear, a crank shaft having a portion removably fitted in the tapered passage of the second gear, bearings for the crank shaft against one of which the end of the hub of the second gear at the minor end of its passage rests, and means carried by the crank shaft and resting against the second bearing for holding the crank shaft against longitudinal movement in the direction of the second bearing.

7. An apparatus for emulsifying milk and butter comprising an emulsion vessel, a cover for the vessel having a central opening and a flange circumscribing the opening, a gear rotatably and removably engaged with the flange, a dasher within the vessel operatively connected with the gear, a second gear meshing with the first named gear, a shaft for the second gear, open topped bearings for the shaft, and a keeper for the shaft and first named gear removably secured to the cover and lying in such relation to said shaft and gear as to prevent displacement thereof from the bearings and flange respectively.

8. An apparatus for emulsifying milk and butter comprising an emulsion vessel, a cover for the vessel having a central opening and a flange circumscribing the opening, a gear rotatably and removably engaged with the flange, a dasher within the vessel operatively connected with the gear, a second gear meshing with the first named gear, a shaft for the second gear, open topped bearings for the shaft and a keeper for the shaft and first named gear removably secured to the cover and lying in such relation to said shaft and gear to prevent displacement thereof from the bearings and flange respectively.

9. An apparatus for emulsifying milk and butter comprising an emulsion vessel, a cover for the vessel having a central opening and a flange circumscribing the opening, a gear rotatably and removably engaged with the flange, a dasher within the vessel operatively connected with the gear, a second gear meshing with the first named gear, a shaft for the second gear, open bearings for the shaft, a keeper for the shaft and first named gear removably secured to the cover and lying in such relation to said shaft and gear as to prevent displacement thereof from the bearings and flange respectively, and a handle carried by the keeper.

In testimony whereof, I affix my signature, in presence of two witnesses.

BENJAMIN N. HAWES.

Witnesses:
JOHN H. SIGGERS,
GEO. H. CHANDLEE.